UNITED STATES PATENT OFFICE.

JAMES H. CONNOR, OF PITTSBURGH, PENNSYLVANIA.

PROCESS OF MAKING ARTIFICIAL FERTILIZER, &c.

1,283,678.    Specification of Letters Patent.    Patented Nov. 5, 1918.

No Drawing.    Application filed April 27, 1916.    Serial No. 93,881.

*To all whom it may concern:*

Be it known that I, JAMES H. CONNOR, a resident of Pittsburgh, in the county of Allegheny and State of Pennsylvania, have invented a new and useful Improvement in Processes of Making Artificial Fertilizer, &c., of which the following is a specification.

This invention relates to a process of manufacturing artificial fertilizer, and particularly fertilizer containing potassium compounds or products. The object of the invention is to provide a method whereby a fertilizer having all of the ingredients to make a complete and perfect plant food, can be produced at a low cost, and in such form that the several plant food ingredients are largely water soluble and available.

Generally stated, the invention consists in taking potassium containing vegetable matter, together with some nitrogenous organic matter, and tri-calcium phosphate, and, if desired, also open hearth or blast furnace slag or flue dust, and adding thereto water and a suitable re-agent, and treating the entire mixture simultaneously in a closed vat, under steam pressure from 10 to 100 lbs., thereby thoroughly digesting the same, and then drawing off the liquor and boiling it down, preferably to a dry state.

The process also involves the production of potassium compounds from the potassium containing vegetable matter, without the addition of the nitrogenous or phosphatic matter used in the production of fertilizers.

As potash containing vegetable matter, I preferably use tobacco stems, that is the residue from tobacco stemmeries, after the leaf has been stripped from the same. This contains from 6 to 12 per cent. potassium compound and from 2 to 4 per cent. of ammonia or nitrogen. This can be used either in a ground or crushed state, or can be first burned and the ash used. When it is burned, the smoke is carried through a tank of water, thereby extracting the nicotin as a by-product. This nicotin liquor can be converted into any nicotin product, by suitably concentrating the same.

For producing a potassium compound, the potassium containing vegetable matter, such as tobacco stems, or the ash thereof is treated in a closed vat under steam pressure with a suitable alkaline re-agent, such as soda ash, caustic soda, soda bottoms or niter cake. Whatever re-agent is used is put in the vat with the tobacco stems or ash therefrom and is digested under the steam pressure above named, after which the liquor is drawn off, taken to another tank and boiled down, and can be used either in the wet form, or can be boiled down to dryness.

When producing a fertilizer, there is added to the vat containing the tobacco stems or ash and the re-agent, other material depending upon the character of the fertilizer to be produced. To produce a fertilizer containing more ammonia and nitrates, there is added to the vat prior to the digesting, some suitable nitrogenous animal matter, preferably what is known as "tankage", which is the sediment or residue refuse from packing houses or other industries, remaining in the rendering tank after the oil and grease have been extracted and the tank water drawn off. Such matter is usually subjected to pressure in order to expel the greater part of the water, and the residue is known as "press-cake". I make use of this press-cake either in the wet state, that is as it comes from the press, or in the dry state, that is after being passed through a drier, and in which form it is known as "dry tankage". Such press-cake contains varying percentages of ammonia, and some bone phosphate according to the nature of the material from which it is obtained, and before being dried also contains from 40 to 50 per cent. of moisture. The fertilizer made from the tobacco stems and such refuse animal matter will contain potassium, ammonia, nitrates and a certain percentage of bone phosphate, all in soluble and available form.

Phosphoric acid in the fertilizer may be obtained by adding to the vat any material containing bone phosphate of lime, such for instance as animal bone in any form, but preferably from phosphate rock. This phosphatic material is added to the vat in pulverized form, and the entire mixture is digested in the vat by means of the steam, and the liquor afterward drawn off and boiled down.

If more lime is desired, it can be supplied by adding to the vat either open hearth or granulated slag. Whenever slag is added an alkaline re-agent, preferably soda ash, is necessary. The slag usually contains from 30 to 40 per cent. of a lime constituent mostly in the form of the silicate, but a portion existing as calcium oxid, 18 to 20 per cent. of iron, and about 9 per cent. of a calcium magnesium compound in the form of a silicate, and from 7 to 14 per cent. of magnesium salts. The slag is used in the form that it comes from the blast furnace whether granulated or in solid form, but if solid it must first be crushed to substantially the size of granulated slag. The slag may be used either with or without the phosphate rock and refuse animal matter.

If desired, flue dust may also be added, this also containing a considerable amount of lime, and this can be used either with or without the phosphate rock or the refuse animal matter, depending upon the particular character of fertilizer to be produced. In all cases the entire mixture is put in the vat with the re-agent, with water added, and then subjected to the digesting process above named. Preferably the steam is superheated, thus giving a high temperature.

The quantities of the different ingredients that will be used will vary according to the percentage of potassium compound, ammonia and phosphoric acid desired in the fertilizer, and also according to the strength of the different materials, it being well known that these materials vary in the percentage of ammonia, bone phosphate of lime and potassium compound contained therein. A very satisfactory fertilizer containing all of these ingredients can be produced by using from 300 to 600 lbs. of tobacco stems, from 400 to 700 lbs. of ammonia containing animal refuse (measured in its wet state), and from 300 to 500 lbs. of finely pulverized bone phosphate of lime, together with the necessary quantity of the re-agent. When soda ash is used as the re-agent, from 50 to 400 lbs. is sufficient. The amount of slag or flue dust to be added will depend upon the extent to which the lime content is to be raised.

By means of the above process a fertilizer can be produced which will be a complete and perfect plant food and in which the several ingredients are united in a uniform and homogeneous mixture and practically all water soluble, thereby increasing the market value of the material, which, as is well known, is based upon the percentage of soluble ingredients. Such fertilizer can be produced at low cost, due to the character of the materials employed and the simplicity of the process, in which all of the material is treated in a single operation in the vat.

What I claim is:—

1. The process of producing a fertilizer, which consists in digesting potassium-containing vegetable matter, tri-calcium phosphatic material, and an alkaline re-agent, in a vat under steam pressure, and then drawing off the liquor and boiling it down.

2. The process of producing a fertilizer, which consists in digesting potassium-containing vegetable matter, tri-calcium phosphatic material, and soda ash, in a vat under steam pressure, and then drawing off the liquor and boiling it down.

3. The process of producing a fertilizer, which consists of digesting a tobacco product, bone phosphate of lime and an alkaline re-agent, in a vat under steam pressure, and then drawing off the liquor and boiling it down.

4. The process of producing a fertilizer, which consists in digesting a tobacco product, bone phosphate of lime and soda ash, in a vat under steam pressure, and then drawing off the liquor and boiling it down.

5. The process of producing a fertilizer, which consists of digesting a tobacco product, nitrogenous animal matter, bone phosphate of lime and an alkaline re-agent, in a vat under steam pressure, and then drawing off the liquor and boiling it down.

6. The process of producing a fertilizer, which consists of digesting a tobacco product, nitrogenous animal matter, phosphate rock and soda ash, in a vat under steam pressure, and then drawing off the liquor and boiling it down.

7. The process of producing fertilizer, which consists in digesting a tobacco product, slag and an alkaline re-agent, in a vat under steam pressure, and then drawing off the liquor and boiling it down.

8. The process of producing a fertilizer, which consists in digesting a tobacco product, nitrogenous organic matter, slag and an alkaline re-agent, in a vat under steam pressure, and then drawing off the liquor and boiling it down.

9. The process of producing a fertilizer, which consists in digesting a tobacco product, flue dust and an alkaline re-agent, in a vat under steam pressure, and then drawing off the liquor and boiling it down.

10. The process of producing a fertilizer, which consists in digesting a tobacco product, nitrogenous organic matter, flue dust, and an alkaline re-agent, in a vat under steam pressure, and then drawing off the liquor and boiling it down.

11. The process of producing a fertilizer, which consists in digesting potassium-containing vegetable matter, a calcium-containing material, and an alkaline re-agent, in a vat under steam pressure.

12. The process of producing a fertilizer, which consists in digesting potassium-containing vegetable matter, a calcium-containing material, and soda ash, in a vat under steam pressure.

13. The process of producing a fertilizer, which consists in digesting potassium-containing vegetable matter, nitrogenous animal matter, and an alkaline re-agent, in a vat under steam pressure.

14. The process of producing a fertilizer, which consists in digesting potassium-containing vegetable matter, tri-calcium phosphatic material, a further calcium-containing material, and an alkaline re-agent, in a vat under steam pressure.

15. The process of producing a fertilizer, which consists in digesting potassium-containing vegetable matter, slag, and an alkaline re-agent, in a vat, under steam pressure.

16. The process of producing a fertilizer, which consists in digesting potassium-containing vegetable matter, flue dust, and an alkaline re-agent, in a vat under steam pressure.

In testimony whereof, I have hereunto set my hand.

JAMES H. CONNOR.

Witnesses:
GLENN H. LERESCHE,
A. E. JOHNSON.